United States Patent
Colby et al.

(10) Patent No.: US 10,256,065 B2
(45) Date of Patent: Apr. 9, 2019

(54) SYSTEMS AND METHODS FOR CONTROLLING RELAYS

(71) Applicant: SCHNEIDER ELECTRIC IT CORPORATION, West Kingston, RI (US)

(72) Inventors: Kenneth A. Colby, Hollis, NH (US); Luka Petrovic, Billerica, MA (US); Fred William Rodenhiser, Wilmington, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 109 days.

(21) Appl. No.: 14/759,790

(22) PCT Filed: Jan. 10, 2013

(86) PCT No.: PCT/US2013/020976
§ 371 (c)(1),
(2) Date: Jul. 8, 2015

(87) PCT Pub. No.: WO2014/109745
PCT Pub. Date: Jul. 17, 2014

(65) Prior Publication Data
US 2015/0348729 A1 Dec. 3, 2015

(51) Int. Cl.
*H01H 9/00* (2006.01)
*H01H 47/00* (2006.01)
(Continued)

(52) U.S. Cl.
CPC ............ *H01H 47/22* (2013.01); *H01H 47/04* (2013.01); *H01H 47/325* (2013.01); *H02J 9/061* (2013.01)

(58) Field of Classification Search
CPC ..... H01F 7/1805; H01H 47/04; H01H 47/325
(Continued)

(56) References Cited

U.S. PATENT DOCUMENTS 3,852,646 A * 12/1974 Mason .................. H03K 17/64
327/110
4,143,283 A 3/1979 Graf et al.
(Continued)

FOREIGN PATENT DOCUMENTS

CN 101106040 A 1/2008
DE 29909901 U1 9/1999
(Continued)

OTHER PUBLICATIONS

International Search Report and Written Opinion from corresponding PCT Application Serial No. PCT/US2013/020976, dated Mar. 26, 2013.
(Continued)

*Primary Examiner* — Thienvu V Tran
*Assistant Examiner* — Lucy M Thomas
(74) *Attorney, Agent, or Firm* — Lando & Anastasi, LLP

(57) ABSTRACT

A relay control circuit for use with a relay having a coil voltage input. The relay control circuit includes a first input to receive a first voltage capable of energizing the relay from a de-energized state, a second input to receive a second voltage, less than the first voltage, that is capable of maintaining the relay in an energized state, and means, responsive to a relay control signal having one of a first state and a second state, for switchably coupling the coil voltage input to the first input for a period of time sufficient to energize the relay in response to the relay control signal having the first state, and for switchably coupling the coil voltage input to the second input in response to expiration of the period of time.

14 Claims, 11 Drawing Sheets

(51) Int. Cl.
*H01H 51/22* (2006.01)
*H01H 51/30* (2006.01)
*H01H 47/22* (2006.01)
*H02J 9/06* (2006.01)
*H01H 47/04* (2006.01)
*H01H 47/32* (2006.01)

(58) Field of Classification Search
USPC .................................................. 361/160, 154
See application file for complete search history.

(56) References Cited

U.S. PATENT DOCUMENTS

| | | | | |
|---|---|---|---|---|
| 4,729,056 A | * | 3/1988 | Edwards | F02D 41/20 361/153 |
| 5,633,779 A | | 5/1997 | Knoble et al. | |
| 5,975,057 A | * | 11/1999 | Repplinger | F02D 41/20 123/490 |
| 5,986,896 A | * | 11/1999 | Gibart | H01H 47/32 363/131 |
| 6,094,086 A | * | 7/2000 | Chow | H03K 17/164 326/27 |
| 6,100,605 A | * | 8/2000 | Zajkowski | H02J 9/06 307/66 |
| 6,417,651 B1 | | 7/2002 | Kronberg | |
| 6,674,628 B1 | * | 1/2004 | Wohlfarth | H01H 47/325 361/152 |
| 2002/0094498 A1 | * | 7/2002 | Rodriguez-Rodriguez | F23N 5/203 431/18 |
| 2003/0227785 A1 | | 12/2003 | Johnson | |
| 2005/0012505 A1 | | 1/2005 | Wilson et al. | |
| 2005/0047053 A1 | * | 3/2005 | Meyer | F02D 41/20 361/139 |
| 2005/0254270 A1 | | 11/2005 | Melchert et al. | |
| 2008/0186645 A1 | | 8/2008 | Morimoto et al. | |
| 2010/0164579 A1 | | 7/2010 | Acatrinei | |
| 2011/0019328 A1 | | 1/2011 | Morimoto | |
| 2011/0109168 A1 | | 5/2011 | Morimoto et al. | |
| 2013/0002024 A1 | | 1/2013 | Beg et al. | |

FOREIGN PATENT DOCUMENTS

| | | |
|---|---|---|
| EP | 00003152 A1 | 7/1979 |
| EP | 1956622 A2 | 8/2008 |

OTHER PUBLICATIONS

Extended European Search Report from corresponding European Application No. 13870950.6 dated Jul. 8, 2016.

\* cited by examiner

SYSTEMS AND METHODS FOR CONTROLLING RELAYS

CROSS-REFERENCE TO RELATED APPLICATIONS

This application is a U.S. National Stage Application under 35 U.S.C. § 371 of International Application No. PCT/US2013/020976, filed Jan. 10, 2013, which is hereby incorporated herein by reference in its entirety.

BACKGROUND

Field

Embodiments of the present invention are generally directed to systems and methods of controlling a relay, and more particularly to systems and methods of controlling a relay or multiple relays with reduced power dissipation.

Discussion of Related Art

Many electronic devices and circuits include one or more relays for various purposes, such as controlling electric motors or lighting, controlling a high voltage circuit such as an audio amplifier with a low voltage signal, controlling a high current circuit such as the starter solenoid of an automobile with a low current signal, etc. In an uninterruptible power supply (UPS), relays may be used for input switching, to switch from operating under AC power to operating under battery (DC) power, for back-feed protection, or for other purposes.

FIG. 1 illustrates a conventional Form C relay (also called a change-over relay or a single pole double throw (SPDT) relay) that may be included an electronic device, such as a UPS system, as well as a typical control circuit for controlling the relay. As shown in FIG. 1, the relay 100 includes a Common (C) terminal 101, a Normally Closed (NC) terminal 102, a Normally Open (NO) terminal 103, a voltage supply terminal 104, a control terminal 105, and a coil 106. In a device such as a UPS where the relay 100 is used for back-feed protection or input line switching, the common terminal 101 might be electrically coupled to a line output terminal (e.g., a hot output terminal or a neutral output terminal) of an AC power source, the NO terminal 103 electrically coupled to a device input terminal of the UPS, and the NC terminal 102 left unconnected, or used for feedback or some other purpose. The voltage supply terminal 104 of the relay 100 would typically be electrically coupled to a suitable voltage source capable of energizing the relay, and the control terminal 105 of the relay would typically be electrically coupled to ground through a switch 110, such as a MOS transistor, as shown in FIG. 1.

Where it is desired to energize the relay 100, a control signal (S1) is asserted on a control terminal 111 of the switch 110 to close the switch thereby electrically coupling the coil 106 of the relay between the voltage source and ground. The current in the coil of the relay electrically couples the common terminal 101 of the relay to the NO terminal 103 and remains in this position until the control signal is de-asserted.

SUMMARY

According to an aspect of the present invention, a relay control circuit is provided that is configured for use with a relay having a coil voltage input. The relay control circuit comprises a first input to receive a first voltage capable of energizing the relay from a de-energized state in response to a relay control signal having a first state, a second input to receive a second voltage capable of maintaining the relay in an energized state in response to the relay control signal having the first state, the second voltage being less than the first voltage, a switch disposed in series between the first input and the coil voltage input, the switch having a control input to receive a control signal that electrically couples the first input to the coil voltage input in response to the control signal having a first state and that electrically decouples the first input from the coil voltage input in response to the control signal having a second state, a diode electrically coupled in series between the second input and the coil voltage input, and a pulse generator. The pulse generator has an input to receive the relay control signal and an output electrically coupled to the control input of the switch, the pulse generator being configured to output the control signal having the first state for a period of time in response to the relay control signal having the first state.

In accordance with one embodiment, the pulse generator is further configured to output the control signal having the first state for the period of time before changing the control signal to have the second state after the period of time has elapsed. In accordance with an aspect of this embodiment, an anode of the diode is electrically coupled to the second input and a cathode of the diode is electrically coupled to the coil voltage input of the relay. In accordance with various embodiments, the relay and the relay control circuit may be included in a UPS.

In accordance with each of the above described aspects and embodiments, the first voltage corresponds to at least a minimum pick-up voltage of the relay, the second voltage corresponds to at least a minimum hold-up voltage of the relay, and the period of time corresponds to at least a minimum set duration of the relay.

In accordance with various embodiments, the pulse generator can include one of a monostable multivibrator and an RC delay circuit.

In accordance with another embodiment, the relay is a first relay, the relay control signal is a first relay control signal, the diode is a first diode, and the relay control circuit is configured for use with a plurality of relays including the first relay and a second relay, the second relay having a coil voltage input electrically coupled to the coil voltage input of the first relay. In accordance with this embodiment, the relay control circuit further comprises a second diode having an anode to receive the first relay control signal and a cathode electrically coupled to an input of the pulse generator, and a third diode having an anode to receive a second relay control signal having a first state that is capable of energizing the second relay and a second state that is not capable of energizing the second relay, the third diode having a cathode electrically coupled the input of the pulse generator. In accordance with an aspect of this embodiment, the pulse generator is further configured to output the control signal having the first state for the period of time in response to the second relay control signal having the first state. In accordance with a further aspect of this embodiment, the pulse generator is further configured to output the control signal having the first state for the period of time before changing the control signal to have the second state after the first period of time has elapsed. In accordance with yet a further aspect of this embodiment, the first voltage corresponds to at least a minimum pick-up voltage of each of the plurality of relays, the second voltage corresponds to at least a minimum hold-up voltage of each of the plurality of relays, and the period of time corresponds to at least a minimum set duration of each of the plurality of relays.

In accordance with another embodiment, the pulse generator includes a processor programmed to provide the first control signal. In accordance with an aspect of this embodiment in which the relay is a first relay and the relay control signal is a first relay control signal, the relay control circuit is configured for use with a plurality of relays including the first relay and a second relay, the second relay having a coil voltage input electrically coupled to the coil voltage input of the first relay. In accordance with this embodiment, the processor is programmed to provide the control signal having the first state for the period of time in response to a second relay control signal having a first state that is capable of energizing the second relay, the second relay control signal having a second state that is not capable of energizing the second relay.

In accordance with another embodiment in which the relay is a first relay, the relay control signal is a first relay control signal, and the diode is a first diode, the relay control circuit is configured for use with a plurality of relays including the first relay and a second relay. The second relay has a coil voltage input electrically coupled to the coil voltage input of the first relay. In accordance with this embodiment, the relay control circuit further comprises a second diode having an anode to receive the first relay control signal and a cathode electrically coupled to an input of the pulse generator, and a third diode having an anode to receive a second relay control signal having a first state that is capable of energizing the second relay and a second state that is not capable of energizing the second relay, the third diode having a cathode electrically coupled the input of the pulse generator. In accordance with an aspect of this embodiment, the pulse generator is further configured to output the control signal having the first state for the period of time in response to the second relay control signal having the first state before changing the control signal to have the second state after the first period of time has elapsed. In accordance with a further aspect of this embodiment, the pulse generator is one of a monostable multivibrator and an RC delay circuit.

In accordance with a further embodiment, the relay is a first relay and the relay control circuit is configured for use with a plurality of relays including the first relay and at least one additional relay. In accordance with this embodiment, each of the at least one additional relays has a coil voltage input that is electrically coupled to the coil voltage input of the first relay.

In accordance with another aspect of the present invention, a method of controlling a relay is provided. The method comprises receiving a relay control signal having one of a first state and a second state, switchably coupling a coil voltage input of the relay to a first voltage that is capable of energizing the relay from a de-energized state in response to the relay control signal having the first state, maintaining the coil voltage input of the relay at the first voltage for a period of time sufficient to energize the relay, and switchably coupling the coil voltage input of the relay to a second voltage that is lower than the first voltage in response to expiration of the period of time.

In accordance with one embodiment, the second voltage is capable of maintaining the relay in an energized state but incapable of energizing the relay.

In accordance with another embodiment, the relay is a first relay and the relay control signal is a first relay control signal, and the method further comprises receiving a second relay control signal having a first state and a second state, switchably coupling the coil voltage input of the first relay and a coil voltage input of a second relay to the first voltage in response to the second relay control signal having the first state, maintaining the coil voltage inputs of the first and second relays at the first voltage for a period of time sufficient to energize the first and second relays, and switchably coupling the coil voltage inputs of the first and second relays to a second voltage that is lower than the first voltage in response to expiration of the period of time.

In accordance with another aspect of the present invention, a relay control circuit configured for use with a relay having a coil voltage input is provided. The relay control circuit comprises a first input to receive a first voltage capable of energizing the relay from a de-energized state, a second input to receive a second voltage capable of maintaining the relay in an energized state, the second voltage being less than the first voltage, and switching means. The switching means is responsive to a relay control signal having one of a first state and a second state and switchably couples the coil voltage input to the first input for a period of time sufficient to energize the relay in response to the relay control signal having the first state, and switchably couples the coil voltage input to the second input in response to expiration of the period of time.

In accordance with one embodiment, the relay is a first relay, and the switching means includes means, responsive to the relay control signal having one of the first state and the second state, for switchably coupling the coil voltage input of the first relay and a coil voltage input of a second relay to the first input for the period of time sufficient to energize the first relay and the second relay in response to the relay control signal having the first state, and for switchably coupling the coil voltage input of the first relay and the coil voltage input of the second relay to the second input in response to expiration of the period of time.

In accordance with various embodiments, the first voltage corresponds to at least a minimum pick-up voltage of the relay, the second voltage corresponds to at least a minimum hold-up voltage of the relay, and the period of time corresponds to at least a minimum set duration of the relay.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
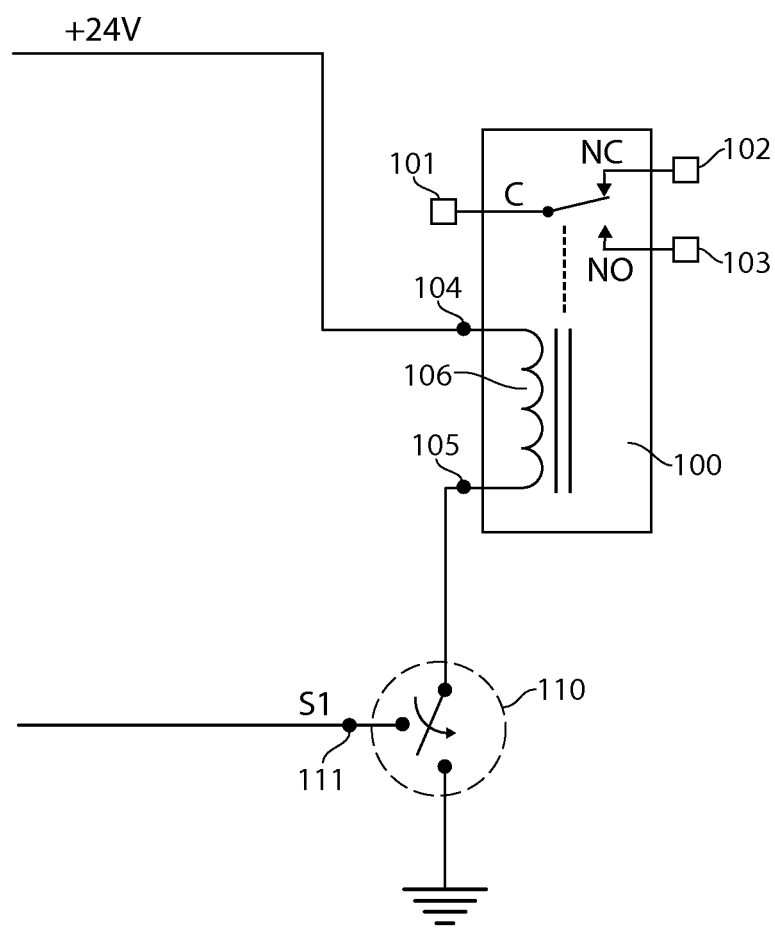
FIG. 1 is a schematic diagram of a relay and a conventional approach for controlling the relay.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As used herein, the term 'relay' refers to low and/or moderate power relays, as well to high power relays (frequently termed "contactors").

Many relays require a minimum voltage (often referred to as the pick-up voltage) to initially energize the relay that is substantially greater than the minimum voltage necessary to hold the relay in the energized state (often referred to as the hold-up voltage). In many relays, the minimum voltage necessary to hold the relay in an energized state can be approximately one half the minimum voltage necessary to initially energize the relay. In light of upcoming Energy Star guidelines and Department of Energy (DOE) requirements and various other "Green" Technology standards that either presently require, or will soon require, improved energy efficiency for all plug-in products, Applicants have developed various systems and methods for controlling a relay, or for controlling a number of relays, that dissipate less power than conventional approaches. In accordance with various embodiments of the present invention, a control circuit is provided that is capable of providing a first voltage to a relay for a first period of time to initially energize the relay and then providing a second voltage, substantially less than the first voltage, to the relay for a remaining period of time. In accordance with other embodiments of the present invention, a control circuit is provided that is capable of providing a first voltage to each of a plurality of relays for a first period of time to initially energize each of the plurality of relays and providing a second voltage, substantially less than the first voltage, to each of the relays for a remaining period of time. These and other aspects and embodiments are now described in detail below.

Figure 2A:
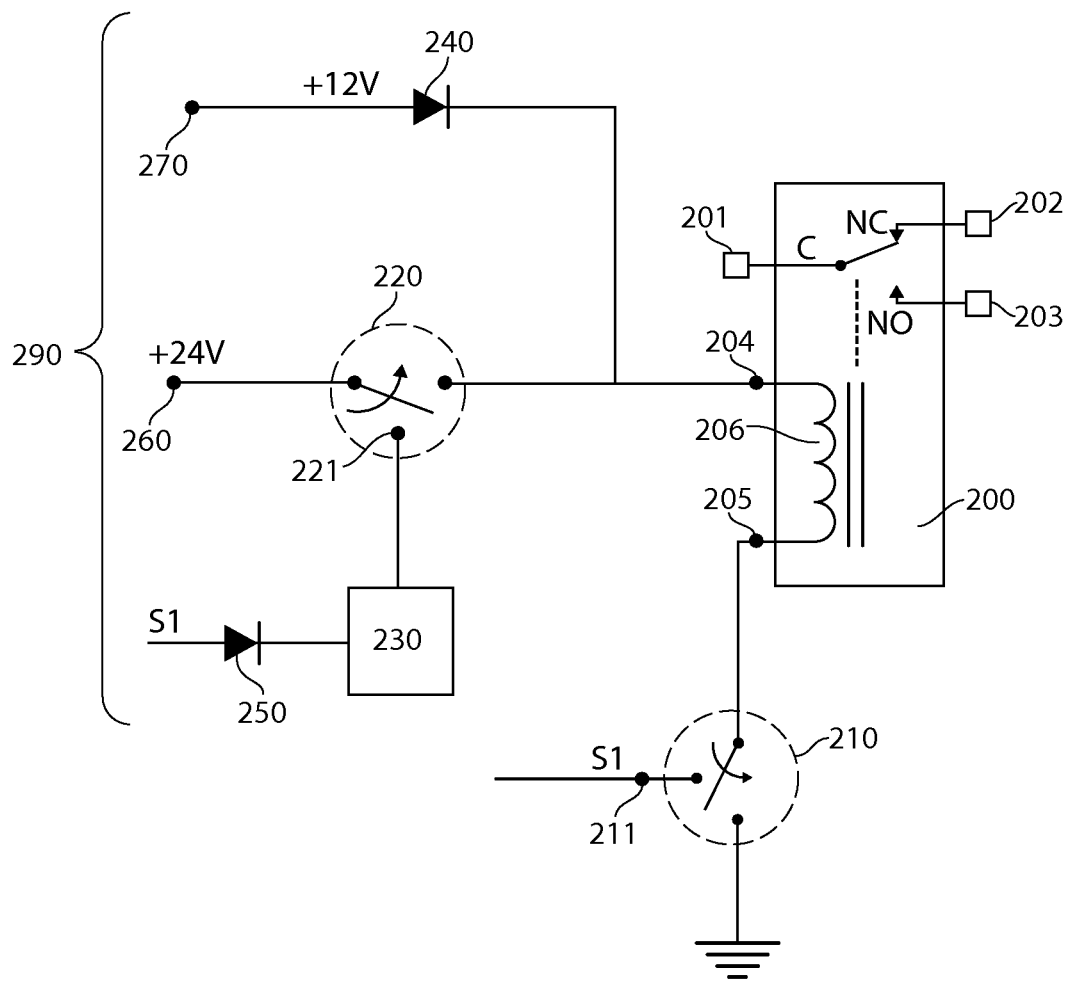
FIG. 2A is a schematic diagram of a relay and a control circuit for controlling the relay in accordance with an embodiment of the present invention.

FIG. 2A is a schematic diagram of a relay and associated control circuitry that may be included in an electronic device in accordance with an aspect of the present invention that can control the relay while dissipating substantially less power than conventional approaches. As shown in FIG. 2A, the relay 200 is depicted as a conventional Form C relay, such as commonly used in electronic devices such as a UPS, although it should be appreciated that other types of relays (e.g., a single pole single throw (SPST) relay) may alternatively be used.

As shown in FIG. 2A, the relay 200 again includes a Common (C) terminal 201, a Normally Closed (NC) terminal 202, a Normally Open (NO) terminal 203, a voltage supply terminal 204, a control terminal 205, and a coil 206. In a device such as a UPS where the relay 200 is used for back-feed protection or input line switching, the common terminal 201 might be electrically coupled to a line output terminal (e.g., a hot output terminal or a neutral output terminal) of an AC power source, the NO terminal 203 electrically coupled to a device input terminal of the UPS, and the NC terminal 202 left unconnected, or used for feedback or some other purpose. As in the circuit of FIG. 1, the control terminal 205 of the relay would typically be electrically coupled to ground through a switch 210, such as a MOS transistor, as shown in FIG. 2A. As in the circuit of FIG. 1, a control signal (S1) that is received on a control terminal 211 of the switch is used to actuate the relay 200.

However, in contrast to the relay 100 described above with respect to FIG. 1, the relay 200 depicted in FIG. 2A includes a relay control circuit 290 operative to energize the relay 200 using a first voltage and then hold the relay 200 in that energized state using a second voltage that is substantially less than the first voltage. In the embodiment shown in FIG. 2A, the control circuit 290 includes a switch 220, a pulse generator 230, a first diode 240, and optionally, a second diode 250. As shown in FIG. 2A, the switch 220 is electrically coupled in series between a first voltage supply terminal 260 that provides a first voltage (shown as 24 V) and the voltage supply terminal 204 of the relay 200. The first voltage corresponds to at least a minimum voltage level required to energize the relay from a previously non-energized state, and is frequently termed the pick-up voltage. A control terminal 221 of the switch 220 is electrically coupled to an output of the pulse generator 230. The diode 240 is electrically coupled in series between a second voltage supply terminal 270 that provides a second voltage (shown as 12 V) and the voltage supply terminal 204 of the relay 200. The second voltage corresponds to at least a minimum voltage level required to maintain the relay in an energized state, and is frequently termed the hold-up voltage. It should be appreciated that the pick-up voltage and the hold-up voltage will vary dependent on the type of relay being used, such that the voltages of 24 Volts and 12 Volts described herein are exemplary only.

The input terminal of the pulse generator 230 is configured to receive a control signal which may be the same control signal (S1) that is used to energize the relay 200. Optionally, the control circuit 290 can include a second diode 250 having an anode to receive the control signal and a cathode that is electrically coupled to the input of the pulse generator 230, as shown in FIG. 2A. The pulse generator 230 may be any known type of pulse generator, such as a monostable multivibrator (also called a "one-shot") or an RC timer delay circuit, that is capable of asserting an output signal having a first voltage level (such as a logic high voltage) for a period of time that then returns to a second voltage level (such as a logic low voltage) in response to assertion of a control signal. In accordance with an aspect of the present invention, the period of time for which the output signal of the pulse generator 230 is asserted should be greater than the minimum set duration (i.e., the minimum period of time required to energize the relay when supplied with a voltage equal or greater than the pick-up voltage) of the relay 200. For example, in one embodiment, the period of time for which the output signal of the pulse generator 230 is asserted is set to between two to five times the minimum set duration of the relay, for example to between 100 ms-1 second, although other periods of time may be used. In general, the period of time for which the output signal of the pulse generator 230 is asserted should be selected to ensure that even under worse-case conditions, the period of time is sufficient to actuate the relay. Like the pick-up voltage and the hold-up voltage, the minimum set duration of the relay is an electrical parameter that is typically specified by the manufacturer of the relay, and will vary dependent upon the type of relay used.

Figure 2B:
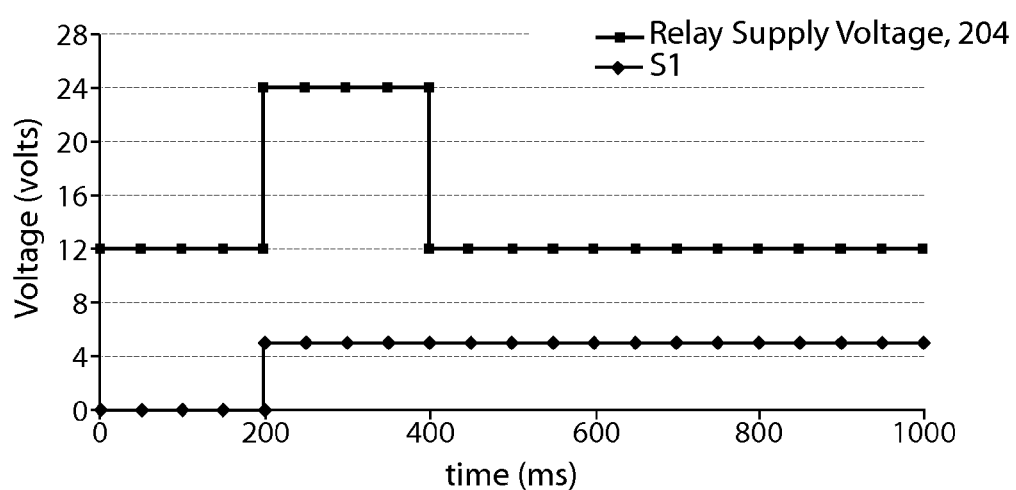
FIG. 2B is an exemplary waveform diagram illustrating the relationship between a relay control signal and the voltage level provided to the relay for the relay control circuit of FIG. 2A.

Operation of the relay and control circuit of FIG. 2A is now described in conjunction with FIG. 2B. Initially (e.g., at time=0 in FIG. 2B), switches 210 and 220 are open and the voltage supply terminal 204 of the relay 200 is electrically coupled to the second voltage supply terminal 270 (e.g., 12 V) through the diode 240. In this initial state where the relay is not energized, no voltage is applied across the relay coil 206 and the common terminal 201 of the relay is electrically coupled to the NC terminal 202.

In response to assertion of the control signal (S1) at time=200 ms, switch 210 is closed and the pulse generator 230 outputs a first voltage level (e.g., a logic high voltage) for a period of time before returning to a second voltage level (e.g., a logic low voltage). In the embodiment depicted in FIGS. 2A and 2B, the pulse generator outputs the first voltage level for approximately 200 ms, with the period of time being selected to be equal or greater than the minim set duration of the relay. The output of the pulse generator 230 is provided to the control terminal 221 of the switch 220, which closes in response to the first output level, thereby electrically coupling the voltage supply terminal 204 of the relay to the first voltage supply terminal and providing the voltage supply terminal 204 of the relay with a voltage equal or greater than the pick-up voltage (e.g., 24 V) for a period of time that is equal to or greater than the minimum set duration of the relay. The closing of switches 210 and 220 thereby energizes the relay 200 causing the common terminal 201 of the relay to be electrically coupled to the NO terminal 203 of the relay.

The presence of diode 240 electrically isolates the second voltage supply terminal 270 from the first voltage supply terminal 260 during the period of time in which the switch 220 is closed. After the period of time has elapsed, the output of the pulse generator 230 returns to the second voltage level (e.g., a logic low voltage), thereby opening the switch 220, and the voltage provided to the voltage supply terminal 204 of the relay 200 returns to the second voltage level (12 V). It should be appreciated that once the relay 200 is energized, de-assertion of the control signal (S1) will cause switch 210 to open, thereby de-energizing (turning off) the relay.

As should be appreciated by those skilled in the art, it is only necessary to use the full rated pick-up voltage for that period of time needed to energize the relay, and that a much lower voltage may be used to maintain the relay in the energized position. Where the hold-up voltage of the relay is one half the pick-up voltage, embodiments of Applicants' invention may utilize one fourth the power of conventional methods of controlling the relay.

In accordance with an embodiment of the present invention, the relay control circuit described above with respect to FIG. 2A may be modified to control a plurality of relays, such as might be included in an electronic device such as a UPS system. Such an embodiment is now described with respect to FIG. 3. Because the embodiment of the relay control circuit illustrated in FIG. 3 is similar to the relay control circuit described above with respect to FIG. 2A, only the differences are described in detail herein.

Figure 3:
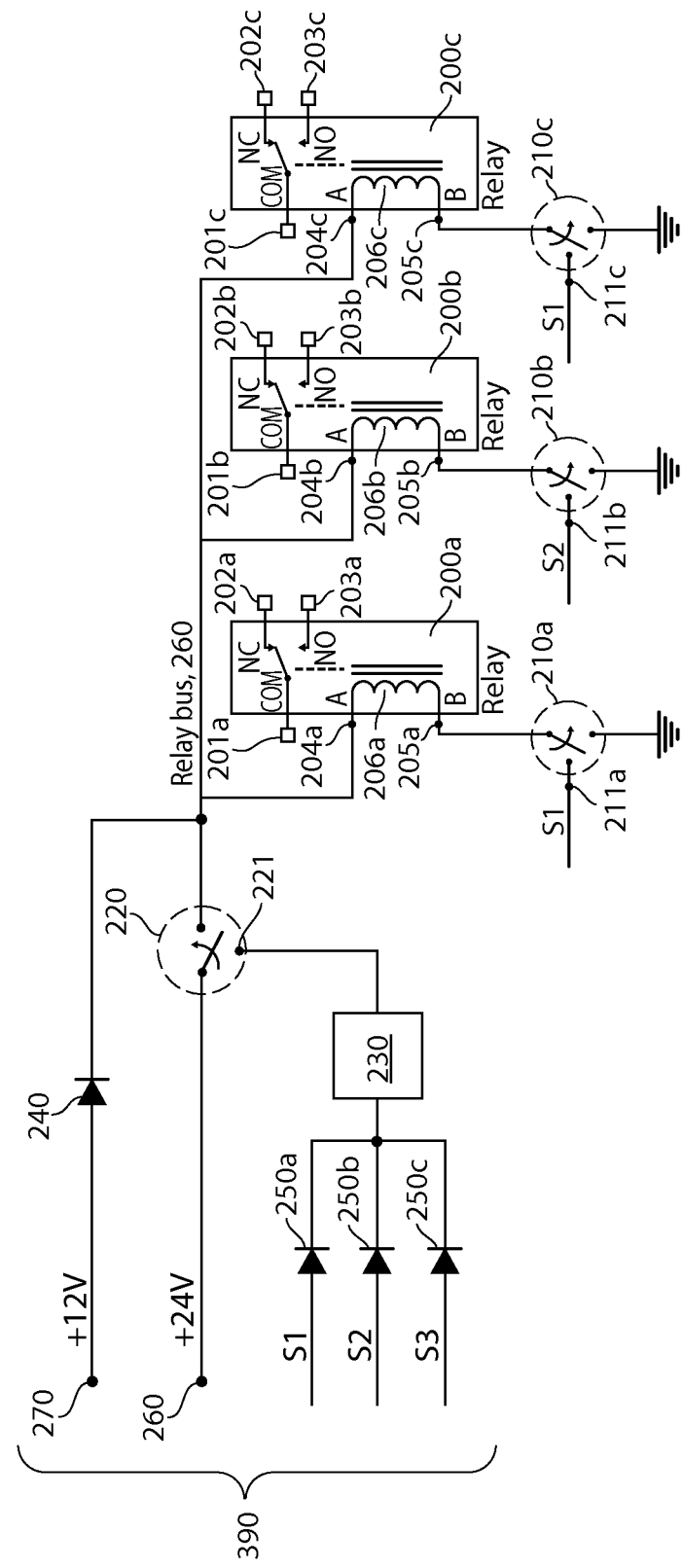
FIG. 3 is a schematic diagram of a plurality of relays and a control circuit that can control each of the plurality of relays in accordance with an embodiment of the present invention.

As shown in FIG. 3, a relay control circuit 390 is provided for controlling a plurality of relays 200a, 200b, and 200c, such as may be typically included in a UPS system. Each of the plurality of relays 200a, 200b, and 200c is again depicted as a conventional Form C relay, although it should be appreciated that other types of relays (e.g., a single pole single throw (SPST) relay) may alternatively be used. Each of the plurality of relays 200a, 200b, 200c again includes a Common (C) terminal 201, a Normally Closed (NC) terminal 202, a Normally Open (NO) terminal 203, a voltage supply terminal 204, a control terminal 205, and a coil 206. In a device such as a UPS where the plurality of relays are used for back-feed protection or input line switching, the common terminal 201a of relay 200a might be electrically coupled to a first phase of power of an AC power source with the NO terminal 203a being electrically coupled to a first device input terminal of the UPS, and the NC terminal 202A left unconnected or used for feedback or some other purpose, the common terminal 201b of relay 200b might be electrically coupled to a second phase of power of the AC power source with the NO terminal 203b being electrically coupled to a second device input terminal of the UPS, and the NC terminal 202B left unconnected or used for feedback or some other purpose, and the common terminal 201c of relay 200c might be electrically coupled to a neutral terminal of the AC power source with the NO terminal 203c being electrically coupled to a neutral device input terminal of the UPS, and the NC terminal 202c left unconnected or used for feedback or some other purpose.

As in the circuit of FIG. 1, the control terminal 205a, 205b, 205c of each relay would typically be electrically coupled to ground through a respective switch 210a, 210b, 210c, such as a MOS transistor, as shown in FIG. 3. Each respective switch receives a respective control signal (S1, S2, S3) on a control terminal 211a, 211b, 211c of the respective switch that is used to actuate the respective relay. It should be appreciated that additional relays electrically coupled to line inputs for other phases or for ground, or additional relays that are used for purposes other than back-feed protection or input line switching may also be provided and controlled by the control circuit 390.

The control circuit 390 is operative to initially energize each relay 200a, 200b, 200c using a first voltage and then hold the relay in that energized state using a second voltage that is substantially less than the first voltage. In the embodiment shown in FIG. 3, the control circuit 390 again includes a switch 220, a pulse generator 230, and a first diode 240. However, the control circuit 390 additionally includes a plurality of additional diodes 250a, 250b, 250c that may correspond in number to the number of relays being controlled. The switch 220 is again electrically coupled in series between a first voltage supply terminal 260 that provides a first voltage (shown as 24 V) and the voltage supply terminal 204a, 204b, 204c of each relay 200a, 200b, 200c. The first voltage can again correspond to at least a minimum voltage level required to energize a respective relay from a previously non-energized state (e.g., the pick-up voltage). The control terminal 221 of the switch 220 is again electrically coupled to the output of the pulse generator 230, and the diode 240 is again electrically coupled in series between a second voltage supply terminal 270 that provides a second voltage (shown as 12 V) and the voltage supply terminal 204a, 204b, 204c of each relay. The second voltage can again correspond to at least a minimum voltage level required to maintain the relay in an energized state (e.g., the hold-up voltage). As with the control circuit 290 of FIG. 2A, it should be appreciated that the pick-up voltage and the hold-up voltage will vary dependent on the type of relay being used, such that the voltages of 24 Volts and 12 Volts are exemplary only.

The input terminal of the pulse generator 230 is configured to receive a plurality of control signals which may be the same control signals S1, S2, S3 that are used to energize a respective relay. Because the control signals may be asserted at different times, or in response to different events, a plurality of additional diodes 250a, 250b, 250c are used to isolate the control signals from one another, with the anode of each diode receiving a respective control signal and the cathode of each diode being electrically coupled to the input of the pulse generator 230, as shown. As previously described, the pulse generator 230 may be any known type of pulse generator, such as a one shot or an RC timer delay circuit that is capable of asserting an output signal having a first voltage level (such as a logic high voltage) for a period of time that then returns to a second voltage level (such as a logic low voltage) in response to assertion of a control signal. As previously described, the period of time for which the output signal of the pulse generator 230 is asserted should be greater than the minimum set duration of each of the respective relays.

Figure 4:
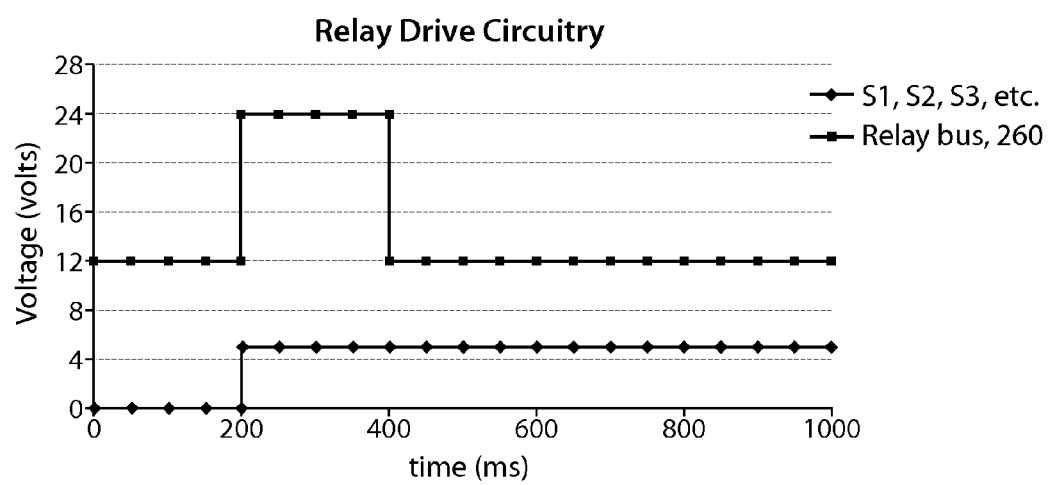
FIG. 4 is an exemplary waveform diagram illustrating the relationship between one or more relay control signals and the voltage level provided to the plurality of relays for the relay control circuit of FIG. 3.

Operation of the relay and control circuit of FIG. 3 is now described in conjunction with FIG. 4. Initially (e.g., at time=0 in FIG. 4), switches 210a, 210b, 210c and 220 are open and the voltage supply terminal 204 of each of the relays 200a, 200b, 200c is electrically coupled to the second voltage supply terminal 270 (e.g., 12 V) through the diode 240. In this initial state where each respective relay is not energized, no voltage is applied across the relay coils and the common terminal 201 of each respective relay is electrically coupled to the NC terminal 202. In response to assertion one or more of the control signals S1, S2, or S3 (e.g., at time=200 ms), one or more of the switches 210a, 210b, 210c is closed and the pulse generator outputs a first voltage level (e.g., a logic high voltage) for a period of time before returning to a second voltage level (e.g., a logic low voltage). In the embodiment depicted in FIGS. 3 and 4, the pulse generator outputs the first voltage level for approximately 200 ms, with the period of time being selected to be equal or greater than the minimum set duration of each of the relays. The output of the pulse generator 230 is provided to the control terminal 221 of the switch 220, which closes in response to the first output level, thereby providing the voltage supply terminal 204a, 204b, and 204c of each of the relays with a voltage equal or greater than the pick-up voltage (e.g., 24 V) for a period of time that is equal to or greater than the minimum set duration of the relay. The interconnection of the output of the switch 220, the cathode of the first diode 240, and the voltage supply terminal 204 of each of the relays 200a, 200b, and 200c thus forms a relay bus 260.

The closing of switch 220 in combination with the closing of one or more of switches 210a, 210b, or 210c thereby energizes a respective relay causing the common terminal 201 of the respective relay to be electrically coupled to the NO terminal 203 of the respective relay. As noted above, the presence of the diodes 250a, 250b, and 250c permits each of the respective relays to be energized without energizing the others. For example, where only the control signal S1 is asserted, only relay 200a will be energized. Control signal S2 could be asserted at a different time, and control signal S3 asserted at yet a different time. Alternatively, if each of the control signals were asserted substantially simultaneously, each of the relays 200a, 200b, and 200c would be energized at substantially the same time (assuming they were similar relays with similar operating characteristics).

The presence of diode 240 again serves to electrically isolate the second voltage supply terminal 270 from the first voltage supply terminal 260 during the period of time in which the switch 220 is closed. After the period of time has elapsed, the output of the pulse generator 230 returns to the second voltage level (e.g., a logic low voltage), thereby opening switch 220, and the voltage provided to the voltage supply terminal 204 of each of the relays 200a, 200b, 200c returns to the second voltage level. It should be appreciated that once a respective relay 200a, 200b, 200c is energized, de-assertion of the respective control signal S1, S2, or S3 will cause the respective switch 210a, 210b, or 210c to open, thereby de-energizing (turning off) the respective relay. It should be appreciated that the de-assertion of the control signal provided to one of the relays will not affect the others. Thus, for example, where control signal S1 is de-asserted but not control signals S2 or S3, only relay 200a would be de-energized (turned off).

As should be appreciated by those skilled in the art, it is only necessary to use the full rated pick-up voltage for that period of time needed to energize a respective relay, and that a much lower voltage may be used to maintain the relays in the energized position. Thus, where the hold-up voltage of a relay is substantially less than the pick-up voltage, embodiments of Applicants' invention may utilize considerably less power than conventional methods of controlling a relay.

Figure 5:
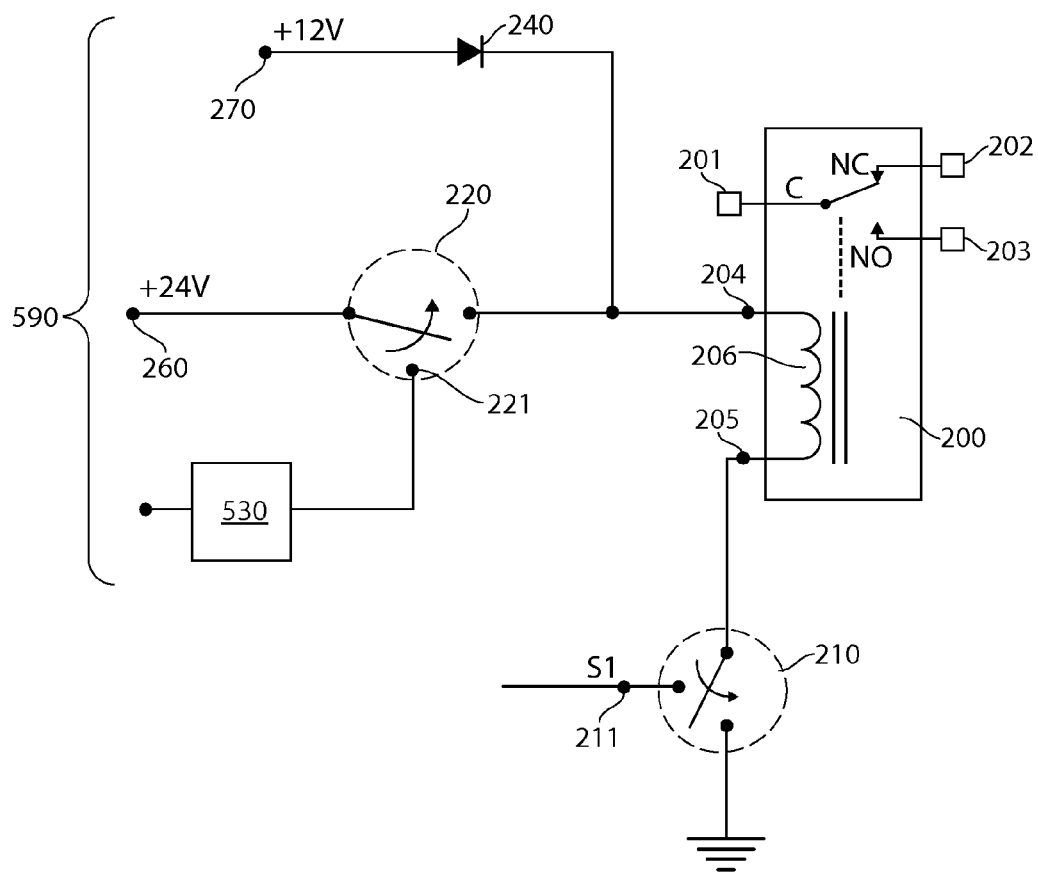
FIG. 5 is a schematic diagram of a relay and a control circuit for controlling the relay in accordance with another embodiment of the present invention.

FIG. 5 is a schematic diagram of a relay and associated control circuitry in accordance with another embodiment of the present invention that may be included in an electronic device and that can control the relay while dissipating substantially less power than conventional approaches. Because this relay and control circuit is similar to that described above with respect to FIG. 2A, only the differences will be described in detail herein.

Figure 6:
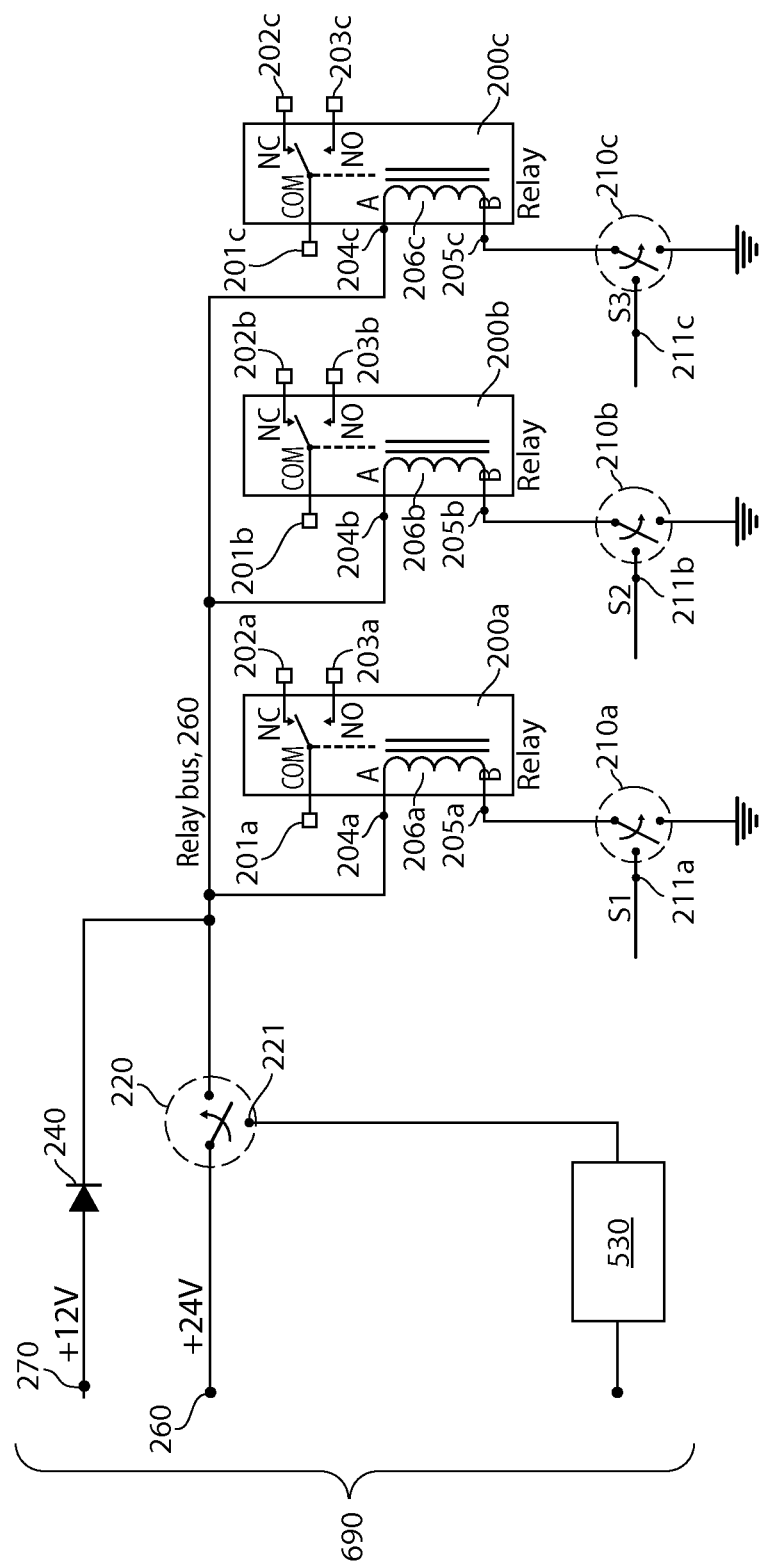
FIG. 6 is a schematic diagram of a plurality of relays and a control circuit that can control each of the plurality of relays in accordance with another embodiment of the present invention

As shown in FIG. 5, a relay control circuit 590 is provided for controlling a single relay, although as described further with respect to FIG. 6, this control circuit may be modified to control a plurality of relays. As in the embodiment described with respect to FIG. 2A, the relay 200 is again depicted as a conventional Form C relay, although it should be appreciated that other types of relays (e.g., a single pole single throw (SPST) relay) may alternatively be used. The relay 200 again includes a Common (C) terminal 201, a Normally Closed (NC) terminal 202, a Normally Open (NO) terminal 203, a voltage supply terminal 204, a control terminal 205, and a coil 206. As in the circuit of FIG. 2A, the control terminal 205 of the relay would typically be electrically coupled to ground through a switch 210, such as a MOS transistor, as shown. The control signal (S1) that is received on the control terminal 211 of the switch 210 is used to actuate the relay 200.

The relay control circuit 590 of this embodiment is again operative to initially energize the relay 200 using a first voltage and then hold the relay 200 in that energized state using a second voltage that is substantially less than the first voltage. The relay control circuit 590 again includes a switch 220, and a first diode 240 that are configured in the same manner as FIG. 2A, and which operate in the manner previously described with respect to FIG. 2A. However, in this embodiment, a processor 530 is used to generate the output signal that is used to control the switch 220, rather than using a dedicated component or circuit, such as the pulse generator 230 described above with respect to FIGS.

2 and 3. In embodiments where the relay and control circuit are included in an electronic device, such as a UPS, the processor 530 may be one of the processors of the UPS that is responsible for controlling the operation of the UPS.

Operation of the relay and control circuit 590 of FIG. 5 is similar to the operation of the relay and control circuit 290 of FIG. 2A and is now described in conjunction with FIG. 2B. Initially (e.g., at time=0 in FIG. 2B), the switches 210 and 220 are open and the voltage supply terminal 204 of the relay 200 is electrically coupled to the second voltage supply terminal 270 (e.g., 12 V) through the diode 240. In this initial state where the relay is not energized, no voltage is applied across the relay coil 206 and the common terminal 201 of the relay is electrically coupled to the NC terminal 202.

In response to assertion of the control signal S1 (e.g., at time=200 ms), switch 210 is closed and the processor 530 outputs a first voltage level (e.g., a logic high voltage) for a period of time before returning to a second voltage level (e.g., a logic low voltage). The processor 530 can be programmed to assert the first voltage level for a period of time that is equal or greater than the minimum set duration of the relay. The output of the processor is provided to the control terminal 221 of the switch 220, which closes in response to the first output level, thereby electrically coupling the voltage supply terminal 204 of the relay to the first voltage supply terminal 260 and providing the voltage supply terminal of the relay with a voltage equal or greater than the pick-up voltage (e.g., 24 V) for a period of time that is equal to or greater than the minimum set duration of the relay.

The closing of switches 210 and 220 thereby energizes the relay 200 causing the common terminal 201 of the relay to be electrically coupled to the NO terminal 203 of the relay. The presence of diode 240 again electrically isolates the second voltage supply terminal 270 from the first voltage supply terminal 260 during that period of time in which the switch 220 is closed. After the period of time has elapsed, the output of the processor returns to the second voltage level (e.g., a logic low voltage), thereby opening switch 220, and the voltage provided to the voltage supply terminal 204 of the relay 200 returns to the second voltage level. It should be appreciated that once the relay 200 is energized, de-assertion of the control signal S1 will cause switch 210 to open, thereby de-energizing (turning off) the relay. As with each of the previously described embodiments, it is only necessary to use the full rated pick-up voltage for that period of time needed to energize the relay, and that a much lower voltage may be used to maintain the relay in the energized position, thereby dissipating substantially less power than conventional approaches.

In accordance with an embodiment of the present invention, the relay control circuit described above with respect to FIG. 5 may also be modified to control a plurality of relays, such as might be included in an electronic device such as a UPS system. Such an embodiment is now described with respect to FIG. 6. Because the embodiment of the relay control circuit illustrated in FIG. 6 is similar to the relay control circuit described above with respect to FIG. 5, only the differences are described in detail herein.

As shown in FIG. 6, the relay control circuit 690 is configured to control a plurality of relays 200a, 200b, and 200c, such as may be typically included in a UPS system. Each of the plurality of relays 200a, 200b, and 200c is again depicted as a conventional Form C relay, although it should be appreciated that other types of relays may alternatively be used. Each of the plurality of relays 200a, 200b, 200c again includes a Common (C) terminal 201, a Normally Closed (NC) terminal 202, a Normally Open (NO) terminal 203, a voltage supply terminal 204, a control terminal 205, and a coil 206. As in the circuit of FIG. 5, the control terminal 205a, 205b, 205c of each relay would typically be electrically coupled to ground through a respective switch 210a, 210b, 210c, such as a MOS transistor, as shown. Each respective switch receives a respective control signal (S1, S2, S3) on a control terminal 211a, 211b, 211c of the respective switch that is used to actuate the respective relay. It should be appreciated that additional relays may be provided and controlled by the control circuit 690.

The control circuit 690 is operative to initially energize each relay 200a, 200b, 200c using a first voltage and then hold the relay in that energized state using a second voltage that is substantially less than the first voltage. The control circuit 690 again includes a switch 220, a first diode 240, and a processor 530. The switch 220 is again electrically coupled in series between a first voltage supply terminal 260 that provides a first voltage (shown as 24 V) and the voltage supply terminal 204a, 204b, 204c of each relay 200a, 200b, 200c. The first voltage can again correspond to at least a minimum voltage level required to energize a respective relay from a previously non-energized state (e.g., the pick-up voltage). The control terminal 221 of the switch 220 is again electrically coupled to the output of the processor 530, and the diode 240 is again electrically coupled in series between a second voltage supply terminal 270 that provides a second voltage (shown as 12 V) and the voltage supply terminal 204a, 204b, 204c of each relay. The second voltage can again correspond to at least a minimum voltage level required to maintain the relay in an energized state (e.g., the hold-up voltage). As with the previously described embodiments, it should be appreciated that the pick-up voltage and the hold-up voltage will vary dependent on the type of relay being used.

Operation of the relay and control circuit of FIG. 6 is now described in conjunction with FIG. 4. Initially (e.g., at time=0 in FIG. 4), switches 210a, 210b, 210c and 220 are open and the voltage supply terminal 204 of each of the relays 200a, 200b, 200c is electrically coupled to the second voltage supply terminal 270 (e.g., 12 V) through the diode 240. In this initial state where each respective relay is not energized, no voltage is applied across the relay coils and the common terminal 201 of each respective relay is electrically coupled to the NC terminal 202.

In response to assertion one or more of the control signals S1, S2, or S3 (e.g., at time=200 ms), one or more of the switches 210a, 210b, 210c is closed and the processor 530 outputs a first voltage level (e.g., a logic high voltage) for a period of time before returning to a second voltage level (e.g., a logic low voltage). In the embodiment depicted in FIG. 6, the processor 530 outputs the first voltage level for approximately 200 ms, with the period of time being selected to be equal or greater than the minimum set duration of each of the relays. The output of the processor 530 is provided to the control terminal 221 of the switch 220, which closes in response to the first output level, thereby providing the voltage supply terminal 204a, 204b, and 204c of each of the relays with a voltage equal or greater than the pick-up voltage (e.g., 24 V) for a period of time that is equal to or greater than the minimum set duration of the relay. The interconnection of the output of the switch 220, the cathode of the first diode 240, and the voltage supply terminal 204 of each of the relays 200a, 200b, and 200c thus forms a relay bus 260.

The closing of switch 220 in combination with the closing of one or more of switches 210a, 210b, or 210c thereby energizes a respective relay causing the common terminal 201 of the respective relay to be electrically coupled to the NO terminal 203 of the respective relay. The presence of the diode 240 again electrically isolates the second supply voltage terminal 270 from the first voltage supply terminal 260 during that period of time in which the switch 220 is closed. After the period of time has elapsed, the output of the processor 530 returns to the second voltage level (e.g., a logic low voltage), thereby opening switch 220, and the voltage provided to each of the voltage supply terminals of the relays 200a, 200b, and 200c returns to the second voltage level.

The processor 530 can be programmed to assert the first voltage level for a period of time that is equal to or greater than the minimum set duration of each of the respective relays in response to any one (or more than one) of the control signals S1, S2, or S3 being asserted. For example, where only the control signal S1 is asserted, only relay 200a will be energized in response to the processor 530 asserting the first voltage level. Control signal S2 could be asserted at a different time, and control signal S3 asserted at yet a different time, with the processor asserting the first voltage level at different times in response to assertion of each control signal. Alternatively, if each of the control signals were asserted substantially simultaneously, each of the relays 200a, 200b, and 200c would be energized at substantially the same time (assuming they were similar relays). It should be appreciated that where each of the relays 200a, 200b, and 200c are energized at different times, the re-assertion of the first voltage level of the processor will not change the state of a previously energized relay, or change the state of an un-energized relay for which its control signal has yet to be asserted. Once a respective relay 200a, 200b, 200c is energized, de-assertion of the respective control signal S1, S2, or S3 will cause the respective switch 210a, 210b, or 210c to open, thereby de-energizing (turning off) the respective relay. It should be appreciated that the de-assertion of the control signal provided to one of the relays will not affect the others. Thus, for example, where control signal S1 is de-asserted but not control signals S2 or S3, only relay 200a would be de-energized (turned off).

As with each of the previously described embodiments, it is only necessary to use the full rated pick-up voltage for that period of time needed to energize a respective relay, and that a much lower voltage may be used to maintain the relays in the energized position. Thus, where the hold-up voltage of a relay is substantially less than the pick-up voltage, embodiments of Applicants' invention may utilize considerable less power than conventional method of controlling a relay. Although aspects and embodiments of the present invention have been described primarily in terms of an electronic device, such as a UPS, it should be appreciated that aspects of the present invention may be used with other types of electronic devices that include one or more relays. Where the electronic device includes a plurality of relays having different operating parameters, more than one relay bus and relay control circuit may be provided, with a first relay bus and relay control circuit controlling a first plurality of relays having similar operating parameters, such as pick up voltage, hold-up voltage, and minimum set duration, and a second relay bus and relay control circuit controlling a second plurality of relays having similar operating parameters.

FIGS. 7A-7D illustrate a relay and associated control circuitry in accordance with another embodiment of the present invention that may be included in an electronic device and that can control the relay while dissipating substantially less power than conventional approaches. As shown in FIG. 7A, the relay 700 is again depicted as a conventional Form C relay, such as commonly used in electronic devices such as a UPS, although it should be appreciated that other types of relays (e.g., a single pole single throw (SPST) relay) may alternatively be used. As depicted, the relay 700 again includes a Common (C) terminal 701, a Normally Closed (NC) terminal 702, a Normally Open (NO) terminal 703, a voltage supply terminal 704, a control terminal 705, and a coil 706. In a device such as a UPS where the relay 700 might be used for back-feed protection or input line switching, the common terminal 701 could be electrically coupled to a line output terminal (e.g., a hot output terminal or a neutral output terminal) of an AC power source, the NO terminal 703 electrically coupled to a device input terminal of the UPS, and the NC terminal 702 left unconnected, or used for feedback or some other purpose. As in the previously described circuits, the control terminal 705 of the relay would typically be electrically coupled to ground through a switch 710, such as a MOS transistor. A control signal (S1) that is received on a control terminal 711 of the switch can be used to actuate the relay 700.

As in the previously described embodiments, a relay control circuit 790 is provided that is operative to energize the relay 700 using a first voltage and then hold the relay 700 in the energized state using a second voltage that is substantially less than the first voltage. However, in contrast to the relay control circuits described previously in which the voltage supply terminal of the relay is provided with the second and lesser voltage when the relay is in a de-energized state and the control signal is not asserted, the relay control circuit 790 of this embodiment provides the voltage supply terminal 704 of the relay 700 with a first voltage that is capable of energizing the relay from the de-energized state when the relay 700 is in the de-energized state and the control signal is not asserted. In a manner similar to that of the previously described embodiments, after the relay is energized, the relay control circuit 790 maintains the relay in the energized state by providing the voltage supply terminal with a second and lesser voltage.

Figure 7A:
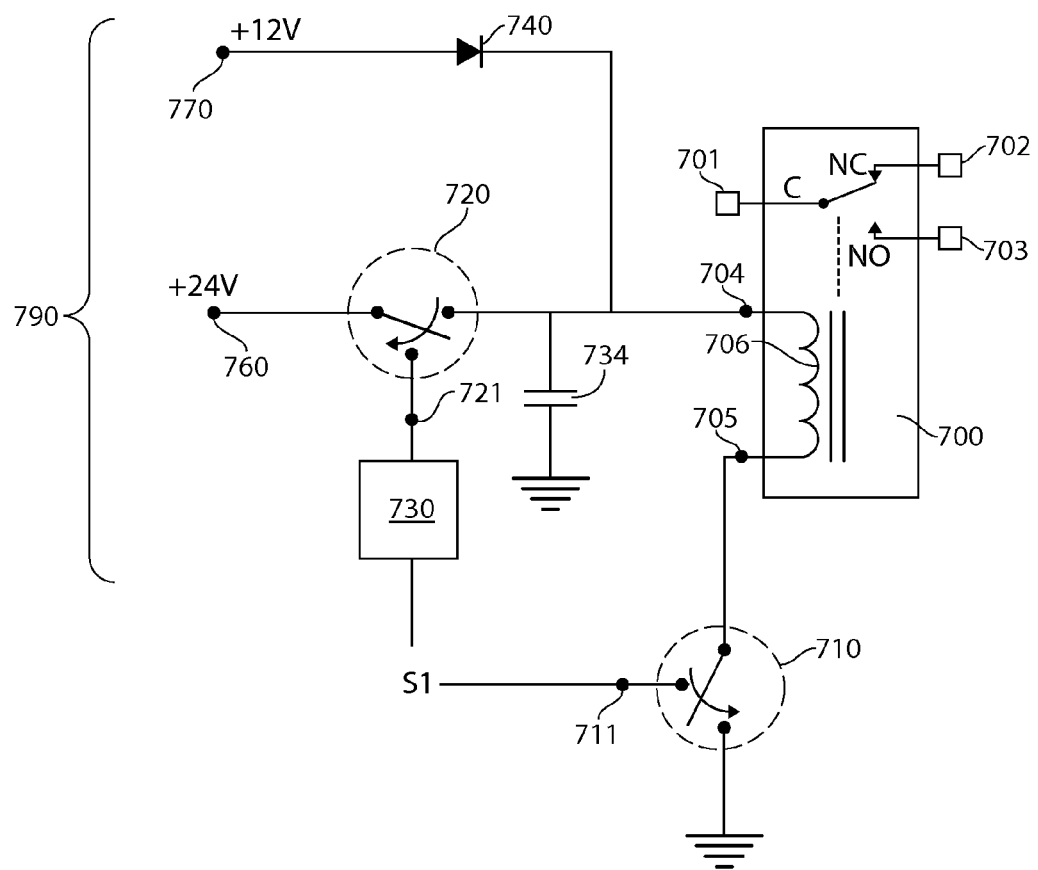
FIG. 7A is a schematic diagram of a relay and a control circuit for controlling the relay in accordance with another embodiment of the present invention.

In the embodiment shown in FIG. 7A, the relay control circuit 790 includes a switch 720, a switch control circuit 730, a diode 740, and a capacitor 734. As shown in FIG. 7A, the switch 720 is electrically coupled in series between a first voltage supply terminal 760 that provides a first voltage (shown as 24 V) and the voltage supply terminal 704 of the relay 700. The first voltage corresponds to at least a minimum voltage level required to energize the relay from a previously non-energized state, frequently termed the pick-up voltage. A control terminal 721 of the switch 720 is electrically coupled to an output of the switch control circuit 730. The capacitor 734 is electrically coupled between the voltage supply terminal 704 of the relay 700 and ground, and the diode 740 is electrically coupled in series between a second voltage supply terminal 770 that provides a second voltage (shown as 12 V) and the voltage supply terminal 704 of the relay 700. The second voltage corresponds to at least a minimum voltage level required to maintain the relay in an energized state (frequently termed the hold-up voltage) and is substantially less than the first voltage. It should be appreciated that the pick-up voltage and the hold-up voltage will again vary dependent on the type of relay being used, such that the voltages of 24 Volts and 12 Volts described herein are exemplary only.

The input terminal of the switch control circuit 730 is configured to receive a control signal which, as described further in detail with respect to FIGS. 7B-D below, can be the same control signal (S1) that is used to energize the relay 700. The switch control circuit 730 is configured to assert an output signal having one state that closes the switch 720 in response to the control signal (S1) not being asserted (for example, having a logic low voltage), and to assert an output signal having another state that opens the switch in response to the control signal being asserted. For example, the switch control circuit 730 can provide the control signal having a first voltage level (such as a logic high voltage) that opens the switch 720 in response to the control signal (S1) being asserted (for example, having a logic high voltage), and to provide an output signal having a second voltage level (such as a logic low voltage) that closes the switch in response to the control signal not being asserted. It should be appreciated that the switch control circuit and switch could alternatively be configured such that a logic low voltage level opens the switch 720 in response to the control signal (S1) being asserted and a high voltage level closes the switch 720 in response to the control signal not being asserted.

Operation of the relay and control circuit of FIG. 7A is now described. Initially, the control signal (S1) is not asserted, and thus the switch 710 is open. In response to the control signal (S1) being in a de-asserted state, the switch control circuit 730 provides an output signal that closes the switch 720 and maintains the switch 720 in a closed state. With switch 720 in a closed state, the voltage supply terminal 704 of the relay 700 is operatively coupled to the first voltage supply terminal 760 (e.g., 24 V). Due to the presence of the diode 740, the second voltage supply terminal 770 is electrically isolated from the first voltage supply terminal 760 when the switch 720 is in a closed state, as the diode 740 is reverse biased. In this initial state where the relay is not energized, the voltage level provided by the first voltage supply terminal 760 is capable of energizing the relay 700 and the common (C) terminal 701 of the relay is electrically coupled to the NC terminal 702. Further, in this initial state, the capacitor 734 is charged to the voltage level of the first voltage supply terminal (e.g., 24 V).

In response to assertion of the control signal (S1), switch 710 is closed and the switch control circuit 730 provides an output signal that opens the switch 720 and maintains the switch 720 in an open state. With switch 720 in an open state, the voltage supply terminal 704 of the relay 700 is no longer operatively coupled to the first voltage supply terminal 760. However, the presence of capacitor 734 holds the voltage level of the voltage supply terminal 704 of the relay 700 at a voltage level of the first voltage supply terminal for a sufficient amount of time to energize the relay 700. The voltage rating and capacitance value of the capacitor 734 will of course vary dependent on the electrical parameters of the relay and the supply voltages that are used, however, in general, the capacitor may be selected so as to maintain the voltage level at the pick-up voltage of the relay for at least the minimum set duration of the relay. In response to assertion of the control signal, the relay 700 is energized causing the common terminal 701 of the relay to be electrically coupled to the NO terminal 703 of the relay.

After a period of time that is dependent upon the electrical parameters of the capacitor, the voltage across the capacitor (and thus, the voltage level seen at the voltage supply terminal 704 of the relay) decreases to the level of the second voltage supply terminal (e.g., 12 V, less any voltage drop across the diode 740), where it is then held at that voltage until the control signal (S1) is de-asserted. Upon the subsequent de-assertion of the control signal (S1), switch 710 is opened, thereby de-energizing (turning off) the relay 700. In response to the de-assertion of the control signal (S1), the switch control circuit 730 provides an output signal that closes the switch 720 and maintains the switch 720 in a closed state. In response to the closing of the switch 720, the capacitor 734 is charged to the level of the first voltage supply terminal (e.g., 24 V), such that the relay 700 may be re-energized in response the re-assertion of the control signal (S1).

Figure 7B:
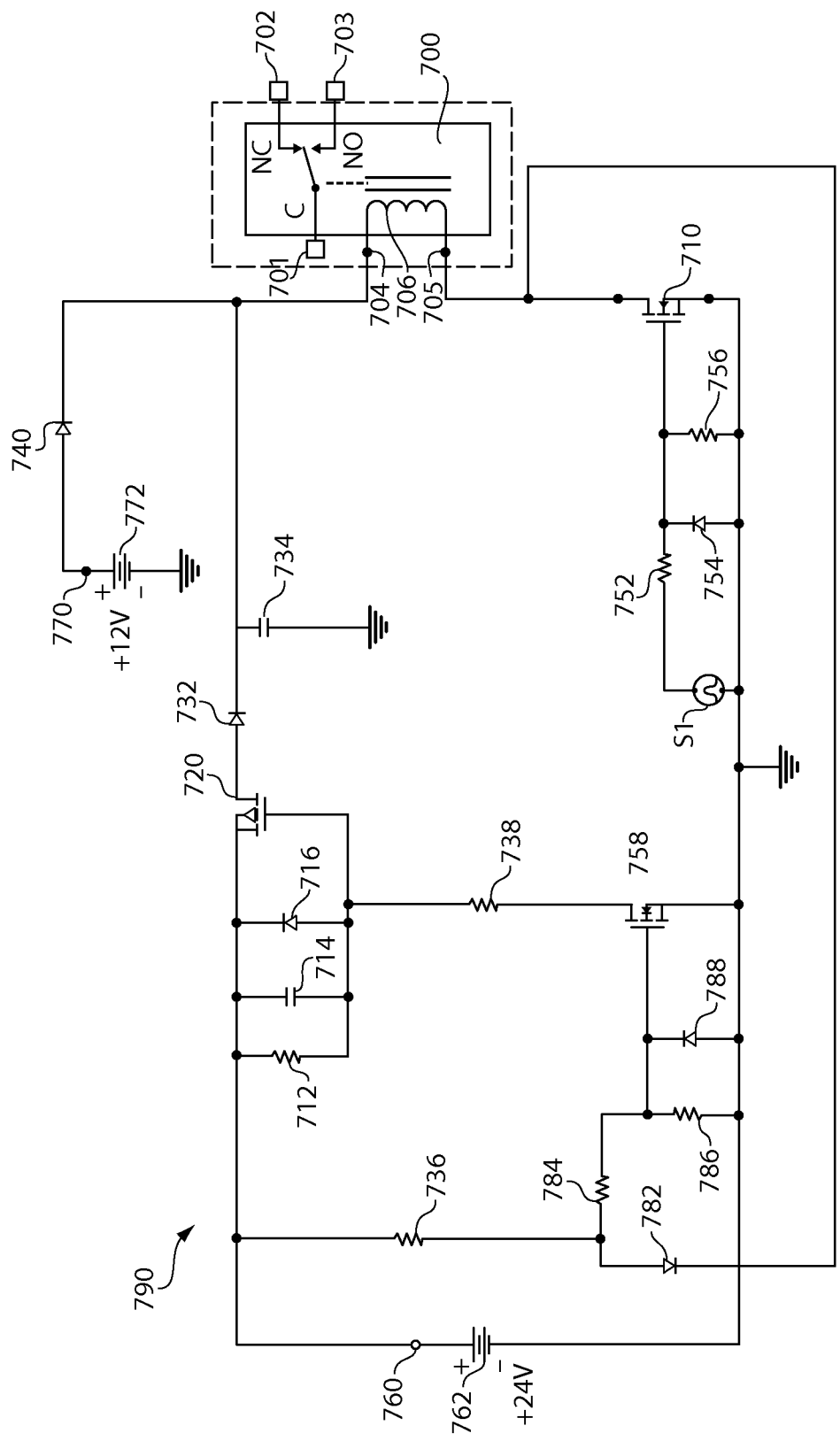
FIG. 7B is a detailed schematic diagram of an exemplary implementation of the relay and control circuit of FIG. 7A in accordance with an embodiment of the present invention.

FIG. 7B is a detailed schematic diagram showing the manner in which the relay and control circuit 790 of FIG. 7A may be realized in accordance with one embodiment of the present invention. As depicted in FIG. 7B, the relay control circuit 790 generally corresponds to those elements shown in FIG. 7B that are not enclosed within dashed lines. Although the relay control circuit 790 depicted in FIG. 7B is realized with MOS transistors, it should be appreciated that other types of transistors (e.g., bipolar transistors) could alternatively be used.

As shown in FIG. 7B, the first voltage supply terminal 760 is electrically coupled to a first voltage source 762 capable of providing sufficient power to energize the relay 700 from a non-energized state. The first voltage supply terminal 760 is also electrically coupled to the voltage supply terminal 704 of the relay 700 through the switch 720 (which, in the embodiment shown in FIG. 7B is shown as a PMOS transistor) electrically coupled in series with a diode 732. As shown, the source of the transistor is electrically coupled to the first voltage supply terminal 760 and the drain is electrically coupled to the anode of the diode 732. The capacitor 734 is electrically coupled between ground and a common connection of the cathode of the diode 732 and the voltage supply terminal 704 of the relay. The second voltage supply terminal 770 is electrically coupled to a second voltage source 772 capable of providing sufficient power to hold the relay 700 in an energized state after it has been previously energized. As noted previously, in accordance with an aspect of the present invention, the voltage level provided by the second voltage source 772 may be substantially less than that provided by the first voltage source 762, for example one half or less than that of the first voltage source 762. The second voltage supply terminal 770 is electrically coupled to the voltage supply terminal 704 of the relay 700 through the diode 740, the anode of which is electrically coupled to the second voltage supply terminal 770 and the cathode of which is electrically coupled to the voltage supply terminal 704 of the relay 700.

A resistor 712, a capacitor 714, and a diode 716 are electrically coupled in parallel between the first voltage supply terminal 760 and the control terminal or gate of the MOS transistor used to implement the switch 720. A resistor 738 in series with a transistor 758 (shown as an NMOS transistor) is electrically coupled between the gate of the transistor used to implement the switch 720 and ground. The drain of the transistor 758 is electrically coupled to the resistor 738 and the source is electrically coupled to ground. A resistor 786 and a diode 788 are electrically coupled in parallel between a control terminal or gate of the transistor 758 and ground, with the cathode of the diode 788 being electrically coupled to the gate of the transistor 758. A first resistor 736 and a second resistor 784 are electrically coupled in series between the first voltage supply terminal 760 and the gate of the transistor 758.

As shown in the embodiment of FIG. 7B, a transistor (shown as an NMOS transistor) may be used to implement the switch 710, with the drain of the transistor being electrically coupled to the control terminal 705 of the relay, the source being electrically coupled to ground, and the control terminal or gate being electrically coupled through a resistor 752 to a relay drive that provides the control signal (S1). A diode 754 and a resistor 756 are electrically coupled in parallel with one another between the gate of the transistor and ground, with the cathode of the diode 754 being electrically coupled to the gate of the transistor. A diode 782 has its anode electrically coupled to resistors 736 and 784 and its cathode electrically coupled to the drain of the transistor that is used to implement the switch 710.

Figure 7C:
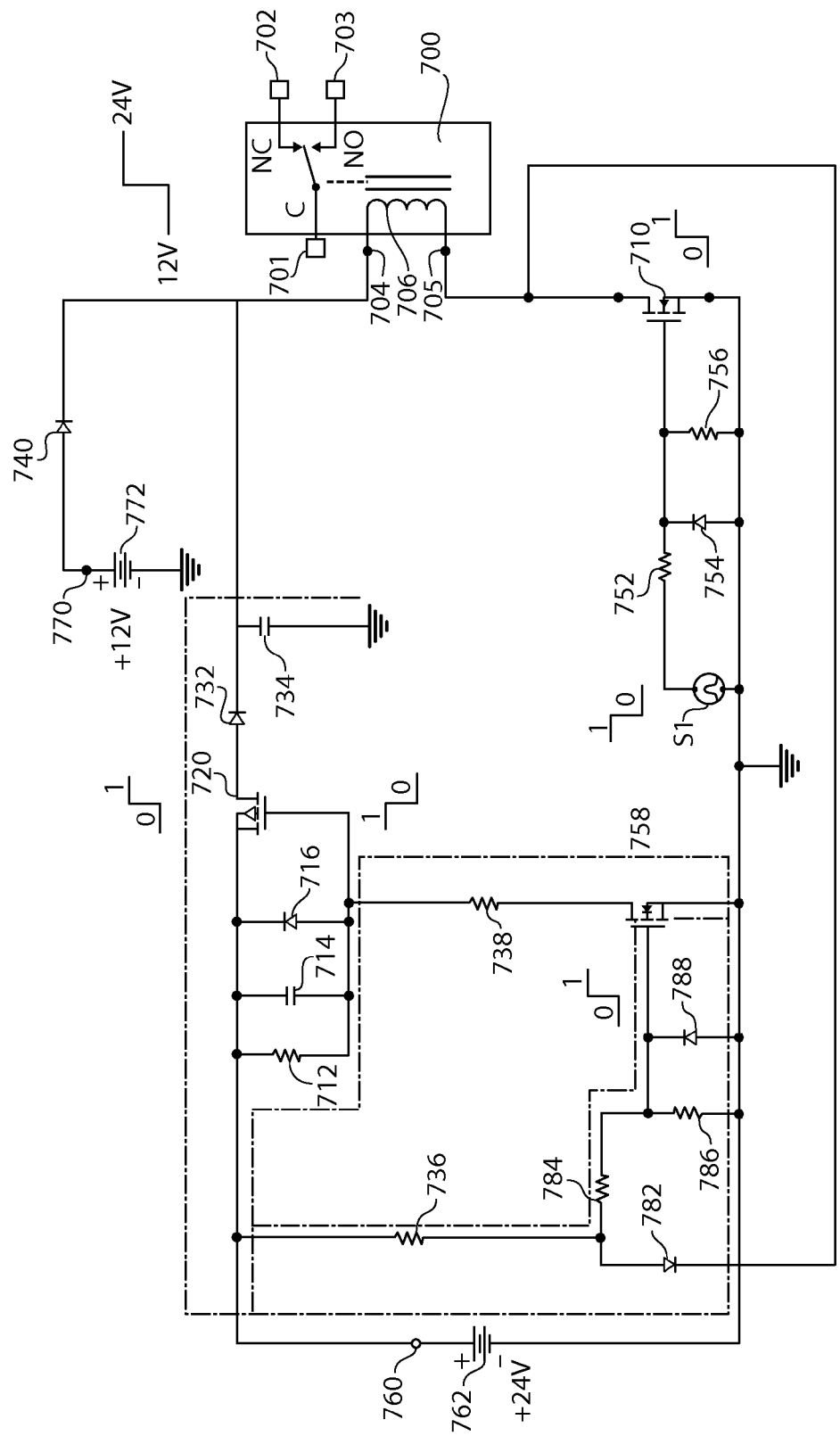
FIG. 7C illustrates those portions of the relay and control circuit of FIG. 7B that are active during the non-energized state of the relay.
Figure 7D:
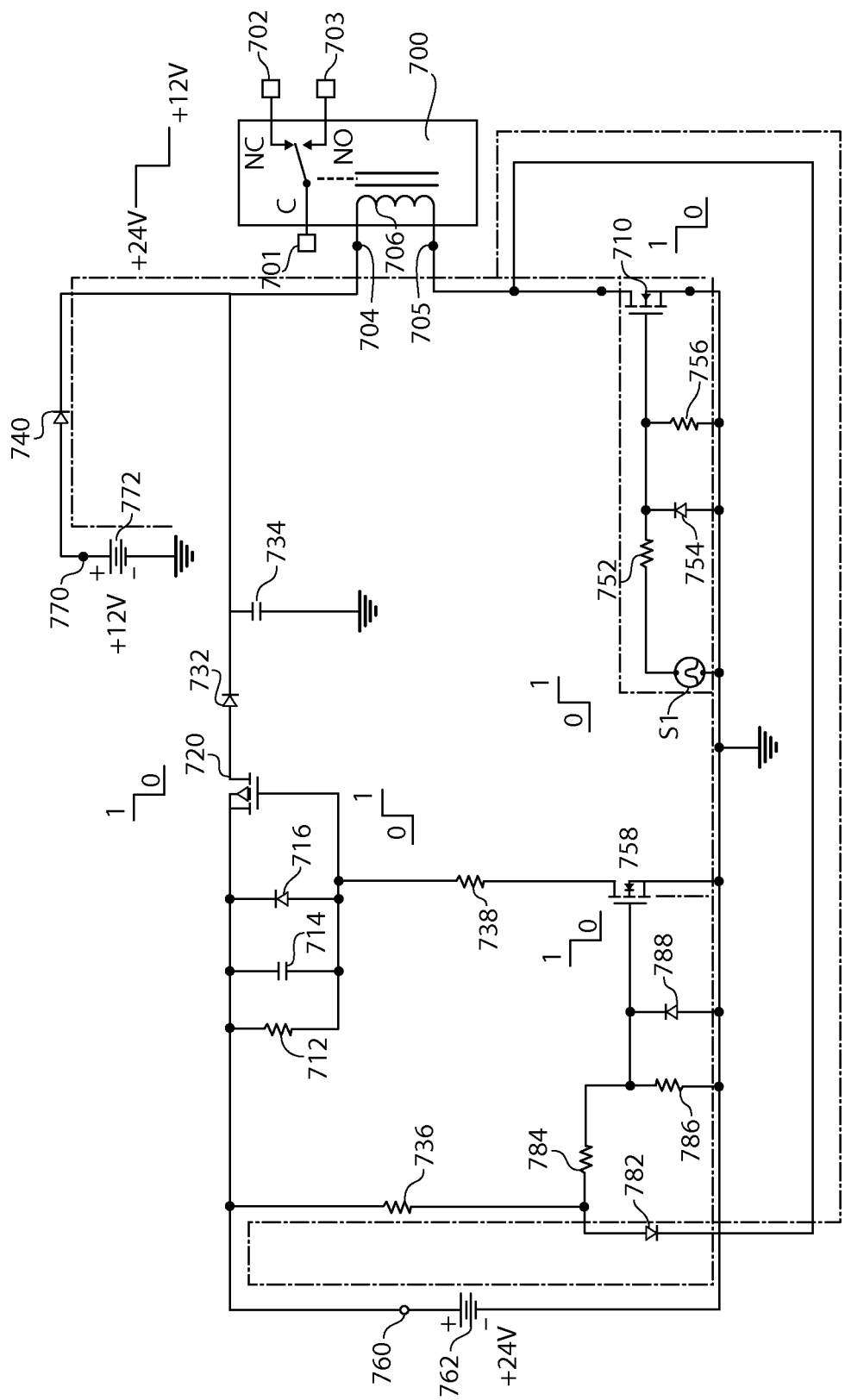
FIG. 7D illustrates those portions of the relay and control circuit of FIG. 7B that are active during the energized state of the relay.

Operation of the relay control circuit 790 depicted in FIG. 7B is now described with respect to FIGS. 7C and 7D in which those sections of the relay control circuit that are active during the period of time where the relay 700 is not energized are shown adjacent to a dotted and dashed line in FIG. 7C, and those sections of the relay control circuit that are active during the period of time where the relay 700 is energized are shown adjacent to a dotted and dashed line in FIG. 7D.

Referring first to FIG. 7C, when the control signal (S1) is not asserted (e.g., when the control signal is at a logic low level), switch 710 is OFF (i.e., is in a non-conducting or open state), and the relay 700 is not energized. Because switch 710 is OFF, diode 782 is reverse biased allowing the first voltage (e.g., 24 V) to be available at the gate of transistor 758, thereby turning transistor 758 ON. The ON state of transistor 758 turns on (i.e., closes) the switch 720, thereby allowing the first supply voltage (e.g., 24 V) to be available at the voltage supply terminal 704 of the relay 700. In this state, all that is needed to energize the relay 700 is assertion of the control signal (S1).

Referring now to FIG. 7D, in response to the assertion of the control signal (S1), e.g., when the control signal is at a logic high level, switch 710 is turned ON (i.e., is in a conducting or closed state), and the relay 700 is energized based on the first voltage (e.g., 24 V). The turn-on of switch 710 forward biases diode 782, which in turn, pulls the gate of transistor 758 to a low state, thereby turning OFF transistor 758. The OFF state of transistor 758 turns off (i.e., opens) the switch 720, thereby preventing the first voltage supply terminal from supplying power to the voltage supply terminal 704 of the relay 700. However, capacitor 734 is capable of holding the first voltage for a sufficient amount of time (e.g., the minimum set duration of the relay 700, or more) to permit the relay to be energized. In response to the opening of the switch 720 and the energizing of the relay 700, the voltage stored on the capacitor 734 decreases to substantially the voltage level of the second voltage (e.g., 12 V, less any voltage drop across the diode 740) due to the diode ORing of the second supply voltage terminal 770 with the capacitor 734 and the voltage supply terminal 704 of the relay. The second supply voltage terminal 770 continues to provide the power necessary to keep the relay in an energized state until the control signal (S1) is de-asserted.

When the control signal is subsequently de-asserted, switch 710 is turned OFF (i.e., is in a non-conducting or open state), thereby de-energizing the relay 700, turning transistor 758 back on, thus closing switch 720 and thereby permitting the first supply voltage to again be available at the voltage supply terminal 704 of the relay 700, such that the relay 700 may again be energized the next time the control signal (S1) is asserted.

As should be appreciated by those skilled in the art, embodiments of the present invention need only provide the full rated pick-up voltage to a relay for that period of time needed to energize the relay, and that a much lower voltage may be used to maintain the relay in the energized position. Thus, where the hold-up voltage of the relay is one half the pick-up voltage, embodiments of Applicants' invention may utilize one fourth the power of conventional methods of controlling the relay.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A relay control circuit configured for use with a plurality of relays including a first relay and a second relay, the first relay having a first coil voltage input and the second relay having a second coil voltage input coupled to the first coil voltage input of the first relay, the first relay being coupled to ground through a first switch, and the second relay being coupled to the ground through a second switch, the relay control circuit comprising:
    a first input to receive a first voltage capable of energizing the first relay from a de-energized state in response to a first relay control signal having a first state that couples the first relay to the ground through the first switch, the first relay control signal also having a second state;
    a second input to receive a second voltage capable of maintaining the first relay in an energized state in response to the first relay control signal having the first state, the second voltage being less than the first voltage;
    a third switch disposed in series between the first input and the first coil voltage input, the third switch having a control input to receive a control signal that electrically couples the first input to the first coil voltage input in response to the control signal having a first state and that electrically decouples the first input from the first coil voltage input in response to the control signal having a second state;
    a first diode electrically coupled in series between the second input and the first coil voltage input;
    a pulse generator having an input to receive the first relay control signal and an output electrically coupled to the control input of the third switch, the pulse generator being configured to output the control signal having the first state for a period of time in response to the first relay control signal having the first state;
    a second diode having an anode to receive the first relay control signal and a cathode electrically coupled to the input of the pulse generator; and
    a third diode having an anode to receive a second relay control signal having a first state that couples the second relay to the ground through the second switch and that is capable of energizing the second relay, and the second relay control signal having a second state that is not capable of energizing the second relay, the third diode having a cathode electrically coupled to the input of the pulse generator and coupled to the cathode of the second diode.

2. The relay control circuit of claim 1, wherein the pulse generator is further configured to output the control signal having the first state for the period of time before changing the control signal to have the second state after the period of time has elapsed.

3. The relay control circuit of claim 2, wherein an anode of the first diode is electrically coupled to the second input and a cathode of the first diode is electrically coupled to the first coil voltage input of the first relay.

4. The relay control circuit of claim 3, wherein the first relay and the relay control circuit are included in a UPS.

5. The relay control circuit of claim 3, wherein the first voltage corresponds to at least a minimum pick-up voltage of the first relay, the second voltage corresponds to at least a minimum hold-up voltage of the first relay, and the period of time corresponds to at least a minimum set duration of the first relay.

6. The relay control circuit of claim 5, wherein the pulse generator includes one of a monostable multivibrator and an RC delay circuit.

7. The relay control circuit of claim 1, wherein the pulse generator is further configured to output the control signal having the first state for the period of time in response to the second relay control signal having the first state.

8. The relay control circuit of claim 7, wherein the pulse generator is further configured to output the control signal having the first state for the period of time before changing the control signal to have the second state after the first period of time has elapsed.

9. The relay control circuit of claim 8, wherein the first voltage corresponds to at least a minimum pick-up voltage of each of the plurality of relays, the second voltage corresponds to at least a minimum hold-up voltage of each of the plurality of relays, and the period of time corresponds to at least a minimum set duration of each of the plurality of relays.

10. The relay control circuit of claim 1, wherein the pulse generator is further configured to output the control signal having the first state for the period of time in response to the second relay control signal having the first state before changing the control signal to have the second state after the first period of time has elapsed, and wherein the pulse generator is one of a monostable multivibrator and an RC delay circuit.

11. A method of controlling a plurality of relays including a first relay and a second relay, the method comprising:
providing a first relay control signal having one of a first state and a second state to a first switch, wherein during the first state the first relay control signal actuates the first switch and couples the first relay to ground;
receiving the first relay control signal at an anode of a first diode, a cathode of the first diode being coupled to a pulse generator;
providing a second relay control signal having one of a first state and a second state to a second switch, wherein during the first state the second relay control signal actuates the second switch and couples the second relay to the ground;
receiving the second relay control signal at an anode of a second diode, a cathode of the second diode being coupled to the pulse generator, and coupled to the cathode of the first diode;
outputting a control signal having a first state from the pulse generator to switchably couple a coil voltage input of the first relay to a first voltage that is capable of energizing the first relay from a de-energized state in response to the first relay control signal having the first state;
outputting the control signal having the first state from the pulse generator to switchably couple a coil voltage input of the second relay to the first voltage in response to the second relay control signal having the first state;
maintaining the coil voltage inputs of the first and second relays at the first voltage for a period of time sufficient to energize the first and second relays; and
outputting the control signal having the second state from the pulse generator to switchably couple the coil voltage inputs of the first and second relays to a second voltage that is lower than the first voltage in response to expiration of the period of time.

12. The method of claim 11, wherein the second voltage is capable of maintaining the relay in an energized state but incapable of energizing the relay.

13. A relay control circuit configured for use with a plurality of relays including a first relay and a second relay, the first relay having a coil voltage input and the second relay having a coil voltage input coupled to the coil voltage input of the first relay, the first relay being coupled to ground through a first switch, and the second relay being coupled to the ground through a second switch, the relay control circuit comprising:
a first input to receive a first voltage capable of energizing the first relay from a de-energized state;
a second input to receive a second voltage capable of maintaining the first relay in an energized state, the second voltage being less than the first voltage; and
switching means, responsive to a first relay control signal having one of a first state and a second state, in the first state the first relay control signal actuating the first switch to couple the first relay to the ground, and responsive to a second relay control signal having one of a first state and a second state, in the first state the second relay control signal actuating the second switch to couple the second relay to the ground, the switching means for switchably coupling the coil voltage input of the first relay and the coil voltage input of the second relay to the first input for a period of time sufficient to energize the first relay and the second relay in response to the first relay control signal having the first state and the second relay control signal having the first state, and for switchably coupling the coil voltage input of the first relay and the coil voltage input of the second relay to the second input in response to expiration of the period of time; wherein
the switching means includes a first diode having an anode to receive the first relay control signal and a second diode having an anode to receive the second relay control signal, the first diode having a cathode, and the second diode having a cathode coupled to the cathode of the first diode.

14. The relay control circuit of claim 13, wherein the first voltage corresponds to at least a minimum pick-up voltage of each of the plurality of relays, the second voltage corresponds to at least a minimum hold-up voltage of each of the plurality of relays, and the period of time corresponds to at least a minimum set duration of the plurality of relays.

* * * * *